United States Patent
Nishimura et al.

(10) Patent No.: US 12,425,548 B2
(45) Date of Patent: Sep. 23, 2025

(54) INFORMATION PROCESSING METHOD, STORAGE MEDIUM, AND INFORMATION PROCESSING SYSTEM

(71) Applicants: TOYOTA JIDOSHA KABUSHIKI KAISHA, Toyota (JP); Nomura Research Institute, Ltd., Tokyo (JP)

(72) Inventors: Kazuya Nishimura, Anjo (JP); Naoki Uenoyama, Kasugai (JP); Keiko Nakano, Kawasaki (JP); Yohei Nakanishi, Nagoya (JP); Takahiro Matsumura, Tokyo (JP)

(73) Assignees: TOYOTA JIDOSHA KABUSHIKI KAISHA, Toyota (JP); Nomura Research Institute, Ltd., Tokyo (JP)

( * ) Notice: Subject to any disclaimer, the term of this patent is extended or adjusted under 35 U.S.C. 154(b) by 19 days.

(21) Appl. No.: 18/645,723

(22) Filed: Apr. 25, 2024

(65) Prior Publication Data
US 2024/0430388 A1    Dec. 26, 2024

(30) Foreign Application Priority Data
Jun. 20, 2023    (JP) .................................. 2023-101026

(51) Int. Cl.
*H04N 7/18*    (2006.01)
*G06V 20/56*    (2022.01)

(52) U.S. Cl.
CPC ............. *H04N 7/183* (2013.01); *G06V 20/56* (2022.01)

(58) Field of Classification Search
CPC ........ H04N 7/183; G06V 20/56; G06V 20/58; G06V 40/103; H04L 67/12; H04L 67/06; H04L 67/52
See application file for complete search history.

(56) References Cited

U.S. PATENT DOCUMENTS

| | | | |
|---|---|---|---|
| 12,085,397 B1* | 9/2024 | Garg | B60W 50/14 |
| 2018/0227393 A1* | 8/2018 | Daub | H04L 51/224 |
| 2022/0185318 A1* | 6/2022 | Ehara | B60W 60/001 |
| 2023/0007439 A1* | 1/2023 | Williams | G06Q 10/0635 |

(Continued)

FOREIGN PATENT DOCUMENTS

JP    2016-066122 A    4/2016

*Primary Examiner* — James M Pontius
(74) *Attorney, Agent, or Firm* — Sughrue Mion, PLLC (57) ABSTRACT

An information processing method is a method executed by an information processing system including a vehicle equipped with an imaging unit, a position information acquisition unit, and a communication unit, and a server device. The information processing method includes: transmitting, from the communication unit of the vehicle to the server device, notification information including a surrounding image in which an elementary school student is shown, and position information of the vehicle when the surrounding image is generated by the imaging unit; and notifying, by the server device, an information terminal of notification information including a lost item image that is a surrounding image in which belongings of the elementary school student are shown but the elementary school student is not shown, and position information of the vehicle when the lost item image is generated by the imaging unit, from among the notification information.

5 Claims, 3 Drawing Sheets

(56) References Cited

U.S. PATENT DOCUMENTS

2023/0191998 A1* 6/2023 Schenk ................. G06V 10/82
                                                  348/148
2024/0403991 A1* 12/2024 Aoyagi ................ G06V 40/103
2025/0016289 A1* 1/2025 Nishimura ............ G08B 21/02
2025/0180366 A1* 6/2025 Garg .................... B60W 50/14

* cited by examiner

FIG. 1

INFORMATION PROCESSING METHOD, STORAGE MEDIUM, AND INFORMATION PROCESSING SYSTEM

CROSS-REFERENCE TO RELATED APPLICATION

This application claims priority to Japanese Patent Application No. 2023-101026 filed on Jun. 20, 2023, incorporated herein by reference in its entirety.

BACKGROUND

1. Technical Field

The present disclosure relates to an information processing method, a storage medium, and an information processing system.

2. Description of Related Art

Conventionally, a device has been known in which when the position of a mobile terminal owned by an elementary school student who is commuting to school using a pre-registered school route is far from the school route, notification is made by sending an alert email. (For example, see Japanese Unexamined Patent Application Publication No. 2016-066122 (JP 2016-066122 A).)

SUMMARY

In a method disclosed in JP 2016-066122 A, when each elementary school student does not have a mobile terminal, it cannot be determined whether the elementary school student is in a state which notification is required.

An information processing method to solve the above issue is an information processing method executed by an information processing system that includes a vehicle equipped with an imaging unit that generates a surrounding image by capturing an image of a surrounding situation, a position information acquisition unit that acquires position information of the vehicle, and a communication unit that communicates with outside, and a server device installed outside the vehicle, and is configured to transmit the surrounding image and the position information from the communication unit of the vehicle to the server device via a communication network, and includes: transmitting, from the communication unit of the vehicle to the server device, notification information including the surrounding image in which belongings of an elementary school student are shown, and position information of the vehicle when the surrounding image is generated by the imaging unit; and notifying, by a processing circuit of the server device, at least one of an information terminal owned by an elementary school and an information terminal owned by an employee of the elementary school of notification information including a lost item image that is the surrounding image in which the belongings of the elementary school student are shown but the elementary school student is not shown, and position information of the vehicle when the lost item image is generated by the imaging unit, from among the notification information.

A storage medium to solve the above issue stores a program executed by a control device of a vehicle equipped with an imaging unit that generates a surrounding image by capturing an image of a surrounding situation, a position information acquisition unit that acquires position information of the vehicle, and a communication unit that communicates with a server device installed outside the vehicle, and the server device is configured to be able to communicate with at least one of an information terminal owned by an elementary school and an information terminal owned by an employee of the elementary school, in which the program causes the control device to execute acquiring notification information including a lost item image that is a surrounding image in which belongings of an elementary school student are shown but the elementary school student is not shown around the belongings, from among the surrounding image, and position information of the vehicle when the lost item image is generated by the imaging unit, and transmitting the notification information from the communication unit to the server device.

An information processing system to solve the above issue is an information processing system including a vehicle equipped with an imaging unit that generates a surrounding image by capturing an image of a surrounding situation, a position information acquisition unit that acquires position information of the vehicle, and a communication unit that communicates with outside, and a server device installed outside the vehicle. The communication unit of the vehicle transmits, to the server device via a communication network, notification information including the surrounding image in which belongings of an elementary school student are shown, and position information of the vehicle when the surrounding image is generated by the imaging unit, and the server device transmits, to at least one of an information terminal owned by an elementary school and an information terminal owned by an employee of the elementary school, notification information including a lost item image that is the surrounding image in which the belongings of the elementary school student are shown but the elementary school student is not shown, and position information of the vehicle when the lost item image is generated by the imaging unit, from among the notification information.

According to the above configuration, even when the elementary school student does not have the information terminal, it is possible to notify the elementary school or the employee of the elementary school that the elementary school student is in a state in which notification is required.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of an information processing method will be described below with reference to FIGS. 1 to 4.
Overall Configuration of Information Processing System 1

Figure 1:
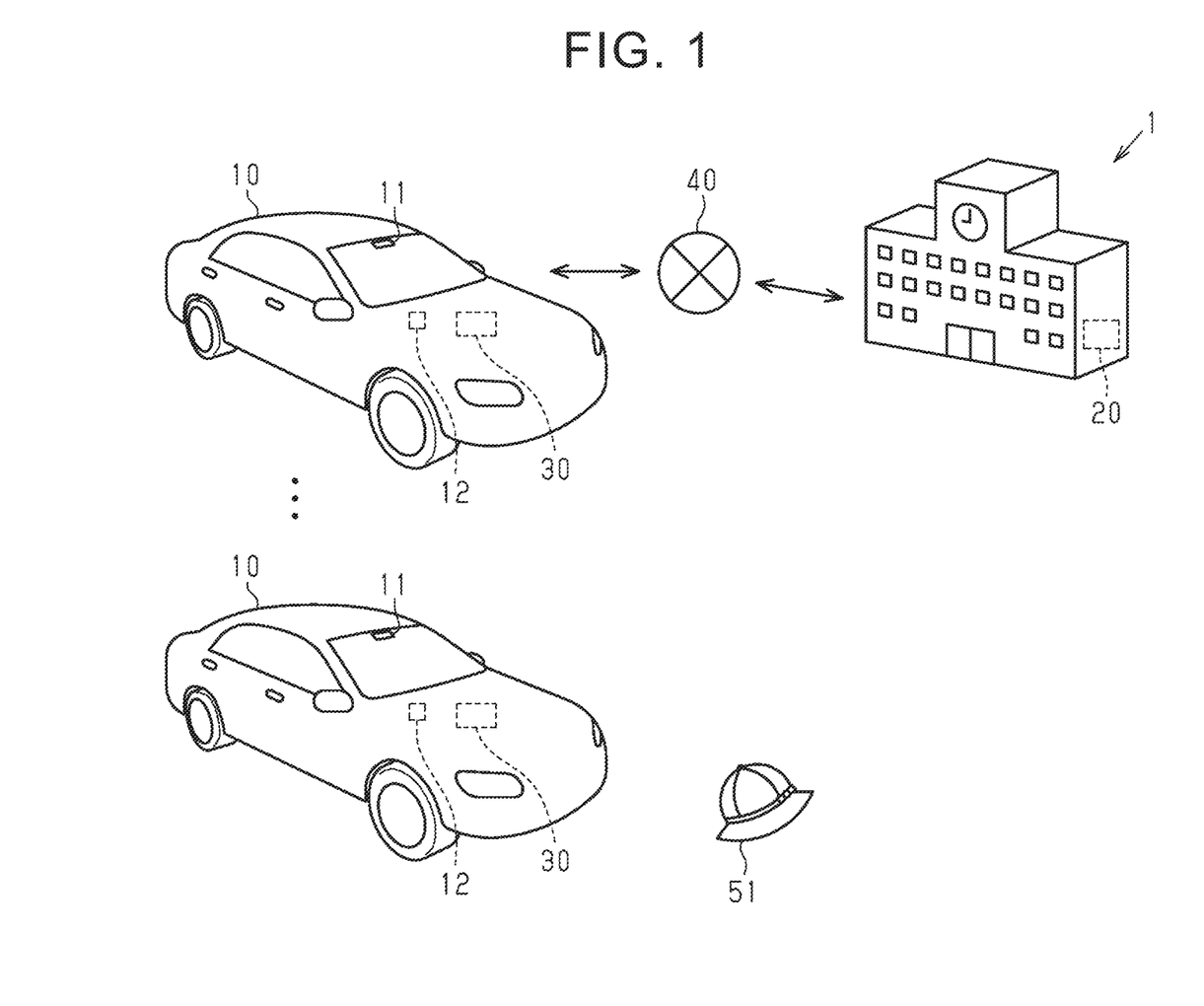
FIG. 1 is a diagram used to describe an information processing system.

As shown in FIG. 1, an information processing system 1 that realizes an information processing method includes, for example, one or more vehicles 10 and one or more server devices 20. The vehicle 10 includes, for example, an imaging unit 11, a position information acquisition unit 12, and a control device 30. The control device 30 and the server device 20 are connected via a communication network 40 such that information can be transmitted and received. The communication network 40 includes, for example, the Internet, a wide area network (WAN), a local area network (LAN), a provider terminal, a wireless communication network, a wireless base station, a dedicated line, and the like.

The imaging unit 11 is, for example, a digital camera using a solid-state imaging element such as a charge coupled device (CCD) or a complementary metal oxide semiconductor (CMOS). An example of the imaging unit 11 is a digital camera that constitutes a drive recorder. The imaging unit 11 captures an image of a surrounding situation of the vehicle 10. Depending on the installation position of the imaging unit 11 in the vehicle 10, the imaging unit 11 can capture images of an area in front of the vehicle 10, an area behind the vehicle 10, and an area to the sides of the vehicle 10. The imaging unit 11 generates a surrounding image by capturing an image of the surrounding situation of the vehicle 10. When the vehicle 10 travels near an elementary school, the surrounding image generated by the imaging unit 11 may include elementary school students and their belongings 51. The belongings 51 are, for example, items that elementary school students are designated to wear or carry when commuting to school, or items that elementary school students use in class. Specifically, the belongings 51 include a school bag, a hat, a uniform, a handbag, a water bottle, and a recorder.

The position information acquisition unit 12 is, for example, a global navigation satellite system (GNSS) receiver. The position information acquisition unit 12 identifies the position of the vehicle 10 based on a signal received from the GNSS satellite, and acquires position information indicating the position of the vehicle 10.

When the belongings 51 are shown but no elementary school student is shown in the surrounding image generated by the imaging unit 11, and a situation in which the belongings 51 are shown satisfies various conditions, the control device 30 transmits information about the elementary school student to the server device 20. Details of the various conditions and the information transmitted by the control device 30 to the server device 20 will be described below.

The server device 20 outputs information received from the control device 30 to, for example, an information terminal 60 provided in an elementary school and an information terminal 60 owned by an employee of the elementary school. This allows the employee of the elementary school to grasp the information about the elementary school student. The information terminal 60 includes, for example, a smartphone, a tablet terminal, and a personal computer.

Configuration of Control Device 30

Figure 2:
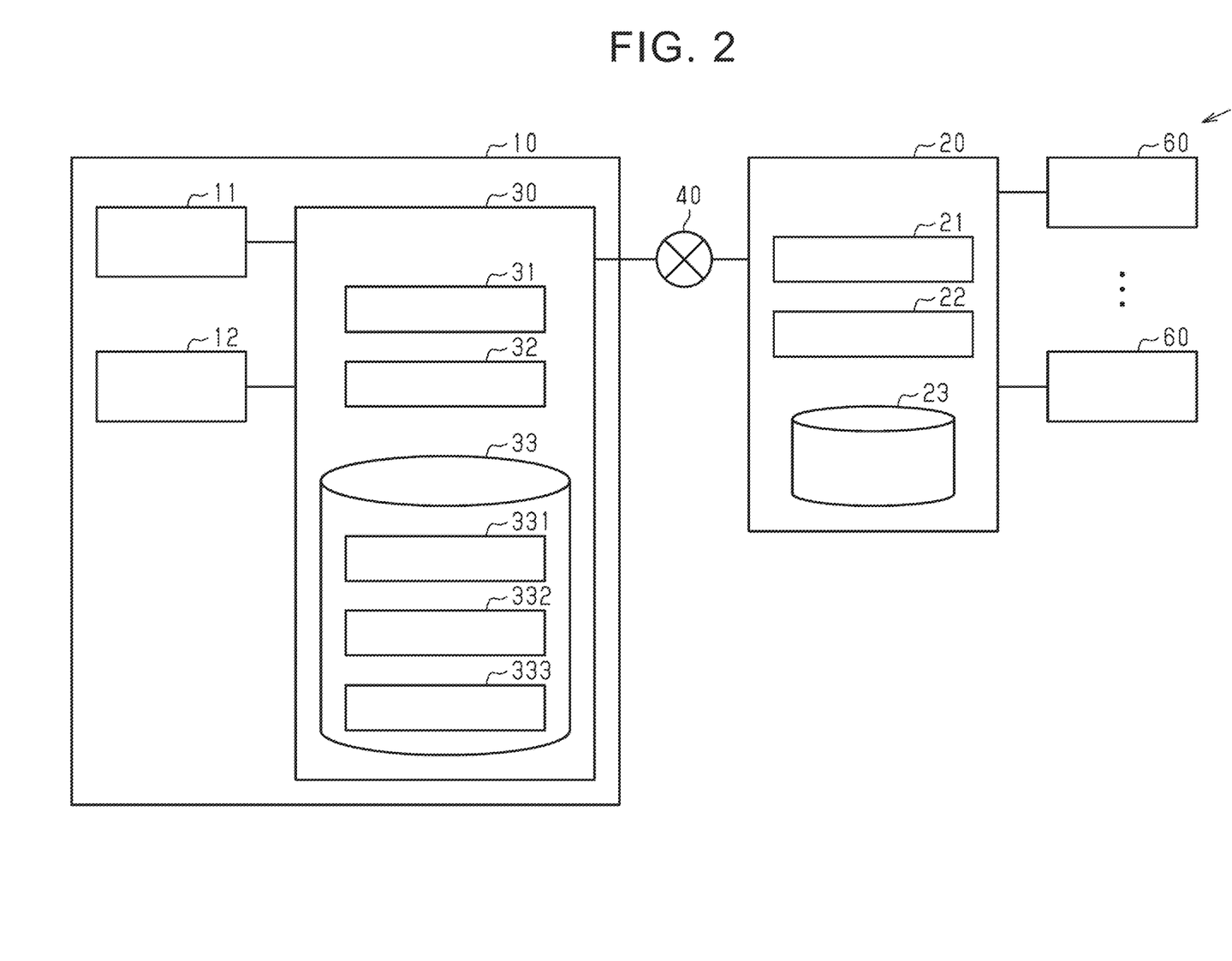
FIG. 2 is a diagram used to describe a server device and a control device.

As shown in FIG. 2, the control device 30 includes, for example, a processing circuit 31, a communication unit 32, and a storage unit 33. The processing circuit 31 is composed of, for example, a hardware processor such as a central processing unit (CPU). The hardware processor executes a program (software), so that the processing circuit 31 can execute various processes. The program may be stored in the storage unit 33 in advance. The storage unit 33 is realized by, for example, a non-transitory storage medium such as a hard disk drive (HDD) or a flash memory. The communication unit 32 includes, for example, a communication circuit or a communication module, and transmits and receives various data to and from the server device 20 and other devices based on the control of the processing circuit 31.

The storage unit 33 stores, for example, a first learned model 331, a second learned model 332, and dangerous area information 333. The first learned model 331 is a model that has applied machine learning that determines whether an elementary school student is shown in the surrounding image generated by the imaging unit 11. An example of the first learned model 331 is a neural network. When the surrounding image is input as an input variable to the first learned model 331, the first learned model 331 outputs an output variable indicating the probability that the elementary school student is shown in the surrounding image. For example, the first learned model 331 outputs a larger value as the output variable as the probability that the elementary school student is shown in the surrounding image increases. In this case, the processing circuit 31 of the control device 30 determines that the elementary school student is shown in the surrounding image when the output variable is equal to or greater than a threshold value. On the other hand, when the output variable is less than the threshold value, the processing circuit 31 determines that the elementary school student is not shown in the surrounding image.

When elementary school students go to school, they carry school bags on their backs and wear hats and uniforms designated by an elementary school. The first learned model 331 is a model that has applied machine learning in advance that can determine that an elementary school student is shown in the surrounding image when a child that satisfies at least one of the following two conditions (A1) and (A2) is shown in the surrounding image.

(A1) A child carries a school bag on the back.

(A2) A child wears clothing designated by an elementary school.

The second learned model 332 is a model that has applied machine learning that determines whether the belongings 51 are shown in the surrounding image generated by the imaging unit 11. An example of the second learned model 332 is a neural network. When the surrounding image is input as an input variable to the second learned model 332, the second learned model 332 outputs an output variable indicating the probability that the belongings 51 are shown in the surrounding image. For example, the second learned model 332 outputs a larger value as the output variable as the probability that the belongings 51 are shown in the surrounding image increases. In this case, the processing circuit 31 of the control device 30 determines that the belongings 51 are shown in the surrounding image when the output variable is equal to or greater than a threshold value. On the other hand, when the output variable is less than the threshold value, the processing circuit 31 determines that the belongings 51 are not shown in the surrounding image.

As described above, the belongings 51 are, for example, items that elementary school students are designated to wear or carry when commuting to school, or items that elementary school students use in class. Specifically, the belongings 51 include a school bag, a hat, a uniform, a handbag, a water bottle, and a recorder. The second learned model 332 is a model that has applied machine learning in advance that can determine that the belongings 51 are shown in the surrounding image when these items are shown in the surrounding image.

The dangerous area information 333 is information in which an elementary school is associated with position information indicating a dangerous area within the school district of the elementary school. The dangerous area is an area where accidents are likely to occur. The dangerous area includes, for example, areas near flood control facilities such as rivers and reservoirs, roads with heavy traffic, and facilities where large vehicles frequently enter and exit.

The processing circuit 31 determines whether the belongings 51 are shown in the surrounding image, based on the surrounding image generated by the imaging unit 11. Specifically, the processing circuit 31 determines whether the belongings 51 are shown in the surrounding image based on the output variable of the second learned model 332 when the surrounding image generated by the imaging unit 11 is input to the second learned model 332.

Based on the surrounding image in which the belongings 51 are determined to be shown, the processing circuit 31 determines whether an elementary school student is shown in the surrounding image. Specifically, the processing circuit 31 determines whether the elementary school student is shown in the surrounding image based on the output variable of the first learned model 331 when the surrounding image generated by the imaging unit 11 is input to the first learned model 331.

When the processing circuit 31 determines that the surrounding image is a surrounding image in which the belongings 51 are shown but the elementary school student is not shown, the processing circuit 31 transmits notification information to the server device 20 of the elementary school via the communication network 40. In the following description, the surrounding image in which the belongings 51 are shown but the elementary school student is not shown will also be referred to as a lost item image. Along with this, determination made by the processing circuit 31 in which the surrounding image is a surrounding image in which the belongings 51 are shown but the elementary school student is not shown is also referred to as determination in which the surrounding image is a lost item image.

The notification information transmitted to the server device 20 includes, for example, a lost item image and position information acquired by the position information acquisition unit 12 when the lost item image is generated by the imaging unit 11. At this time, the processing circuit 31 identifies, based on the position information included in the notification information transmitted to the server device 20, an elementary school that has a school district that includes the position indicated by the position information. Then, the processing circuit 31 transmits the notification information to the server device 20 of the identified elementary school.

Further, when the processing circuit 31 determines that the surrounding image generated by the imaging unit 11 is a lost item image, and the lost item image is a surrounding image generated when the imaging unit 11 captures the image of the dangerous area, the processing circuit 31 transmits notification information to the server device 20. The processing circuit 31 determines whether the belongings 51 shown in the lost item image are located in the dangerous area based on the surrounding image generated by the imaging unit 11 and the position information acquired by the position information acquisition unit 12. When the processing circuit 31 determines that the surrounding image generated by the imaging unit 11 is a lost item image, the processing circuit 31 acquires the position information acquired by the position information acquisition unit 12 when the lost item image is generated by the imaging unit 11.

Subsequently, the processing circuit 31 reads, from the storage unit 33, the dangerous area information 333 designated by an elementary school that has a school district that includes the current position of the vehicle 10. Then, based on the position information acquired by the position information acquisition unit 12 and the dangerous area information 333 read from the storage unit 33, the processing circuit 31 determines whether the position indicated by the position information is a dangerous area. When the processing circuit 31 determines that the position indicated by the position information is a dangerous area, the processing circuit 31 determines that the lost item image is a surrounding image generated when the imaging unit 11 captures the image of the dangerous area.

When the processing circuit 31 determines that the lost item image is the surrounding image generated when the imaging unit 11 captures the image of the dangerous area, the processing circuit 31 transmits notification information to the server device 20 of the elementary school via the communication network 40. The notification information includes, for example, the lost item image when the imaging unit 11 captures the image of the belongings 51 in the dangerous area, and the position information acquired by the position information acquisition unit 12 when the lost item image is generated by the imaging unit 11.

Further, the processing circuit 31 transmits the notification information to the server device 20 when it is determined that the surrounding image generated by the imaging unit 11 during the time of commuting to and from school at the elementary school is the lost item image. When the processing circuit 31 determines that the surrounding image is the lost item image, the processing circuit 31 determines whether the time when the lost item image is generated by the imaging unit 11 is a time of commuting to and from school. The time of commuting to and from school includes the time of commuting to school and the time of commuting from school at the elementary school. An example of the time of commuting to school is between 7:00 a.m. and 9:00 a.m. An example of the time of commuting from school is between 2:00 p.m. and 5:00 p.m.

Here, during the time of commuting to and from school, it is rare that there are no elementary school students around even though the belongings 51 are on the street. Therefore, when it is determined that the surrounding image captured by the imaging unit 11 during the time of commuting to and from school is the lost item image, it is preferable to notify the elementary school or the employee of the elementary school of this. Therefore, when the surrounding image generated by the imaging unit 11 during the time of commuting to and from school at the elementary school is the lost item image, the processing circuit 31 transmits the notification information to the server device 20 of the elementary school via the communication network 40.

Configuration of Server Device 20

As shown in FIG. 2, the server device 20 includes, for example, a processing circuit 21, a communication unit 22, and a storage unit 23. The processing circuit 21 is composed of, for example, a hardware processor such as a CPU. The hardware processor executes a program (software), so that the processing circuit 21 can execute various processes. The program may be stored in the storage unit 23 in advance. The storage unit 23 is realized by, for example, a non-transitory storage medium such as an HDD or a flash memory. The communication unit 22 includes, for example, a communication circuit or a communication module, and transmits and receives various data to and from the control device 30 and other devices based on the control of the processing circuit 21.

Further, one or more information terminals 60 are connected to the server device 20. The communication unit 22 communicates with the information terminal 60 by wire or wirelessly. At this time, the server device 20 and the information terminal 60 may communicate via the communication network 40 described above, or may communicate using another network. In the case of wireless communication, the communication mode between the communication unit 22 and the information terminal 60 may be short-range wireless communication such as Wi-Fi (registered trademark) or Bluetooth (registered trademark). Further, the communication mode between the communication unit 22 and the information terminal 60 may be communication via a network such as the Internet, a WAN, a LAN, a provider terminal, a wireless communication network, a wireless base station, and a dedicated line. The information terminal 60 is realized by, for example, a smartphone, a tablet, or the like.

When the notification information is received from the control device 30, the processing circuit 21 notifies the information terminal 60 of the received information. Specifically, the processing circuit 21 notifies the information terminal 60 that the notification information has been uploaded to the server device 20. When an employee who knows that the notification from the server device 20 has been transmitted to the information terminal 60 operates an operation unit of the information terminal 60, the notification information is downloaded from the server device 20 to the information terminal 60. Then, the information terminal 60 displays the downloaded information on a display unit of the information terminal 60.

Series of Processes Executed in Control Device 30

Figure 3:
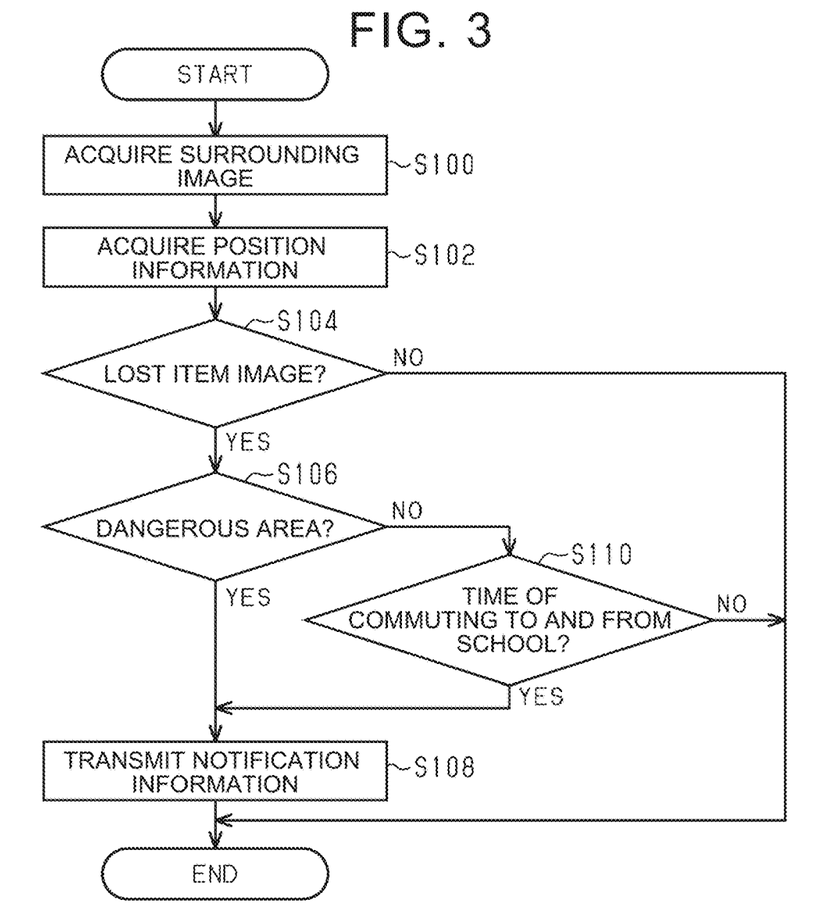
FIG. 3 is a flowchart showing an example of a process executed by the control device.

A series of processes executed in the control device 30 will be described with reference to FIG. 3. The process shown in FIG. 3 is repeatedly executed at predetermined time intervals. First, the processing circuit 31 acquires the surrounding image generated by the imaging unit 11 (step S100). Next, the processing circuit 31 acquires the position information from the position information acquisition unit 12 (step S102). The position information acquired in step S102 is the position information of the vehicle 10 when the surrounding image acquired in step S100 is generated by the imaging unit 11.

The processing circuit 31 determines whether the acquired surrounding image is the lost item image (step S104). In other words, the processing circuit 31 determines whether the acquired surrounding image is the surrounding image in which the belongings 51 of the elementary school student are shown but the elementary school student is not shown. When the processing circuit 31 determines that the surrounding image is not the lost item image (step S104; NO), there is no information to be notified to the server device 20, so that the series of processes ends.

When the processing circuit 31 determines that the surrounding image is the lost item image (step S104; YES), the processing circuit 31 determines whether the lost item image is the surrounding image generated when the imaging unit 11 captures the image of the dangerous area (step S106). The processing circuit 31 determines whether the lost item image is the surrounding image generated when the imaging unit 11 captures the image of the dangerous area, based on the position information acquired in step S102 and the dangerous area information 333. When the processing circuit 31 determines that the lost item image is the surrounding image generated when the imaging unit 11 captures the image of the dangerous area (step S106; YES), the processing circuit 31 causes the communication unit 22 to transmit the notification information to the server device 20 of the elementary school (step S108). The notification information transmitted to the server device 20 in step S108 includes the surrounding image acquired in step S100 during the current execution of the series of processes shown in FIG. 3, and the position information acquired in step S102 during the current execution of the series of processes shown in FIG. 3. After that, the processing circuit 31 ends the series of processes.

When the processing circuit 31 determines that the lost item image is not the surrounding image generated when the imaging unit 11 captures the image of the dangerous area (step S106; NO), the processing circuit 31 determines whether the time when the lost item image is generated by the imaging unit 11 is the time of commuting to and from school (step S110). When the processing circuit 31 determines that the time when the lost item image is generated by the imaging unit 11 is the time of commuting to and from school (step S110; YES), the processing circuit 31 proceeds to step S108. When the processing circuit 31 determines that the time when the lost item image is generated by the imaging unit 11 is not the time of commuting to and from school (step S110; NO), the processing circuit 31 ends the series of processes.

That is, in a case where both of the following two conditions (C1) and (C2) are satisfied even when it is determined that the surrounding image acquired in step S100 is the lost item image, the processing circuit 31 ends the series of processes without transmitting the notification information to the server device 20.

(C1) The lost item image is not the surrounding image generated when the imaging unit 11 captures the image of the dangerous area.

(C2) The time when the lost item image is generated is a time other than the time of commuting to and from school.

Series of Processes Executed in Server Device 20

Figure 4:
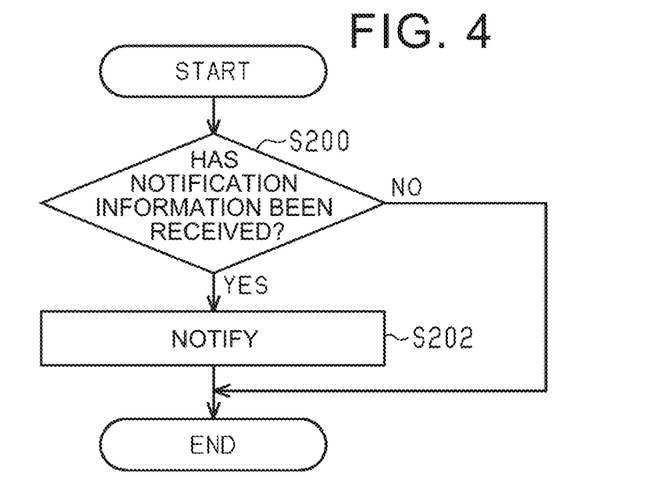
FIG. 4 is a flowchart showing an example of a process executed by the server device.

A series of processes executed in the server device 20 will be described with reference to FIG. 4. The process shown in FIG. 4 is repeatedly executed at predetermined time intervals. The processing circuit 21 determines whether the notification information has been received from the control device 30 (step S200). When the processing circuit 21 has not received the notification information from the control device 30 (step S200; NO), the processing circuit 21 ends the series of processes. When the processing circuit 21 receives the notification information from the control device 30 (step S200; YES), the processing circuit 21 notifies the information terminal 60 of the received information (step S202). After that, the processing circuit 21 ends the series of processes.

Operations and Effects of Embodiment

According to the above embodiment, the following operations and effects can be obtained.

(1) When the vehicle 10 is traveling, the imaging unit 11 generates the surrounding image by capturing the image of the surroundings of the vehicle 10. At this time, the position information acquisition unit 12 acquires the position information of the vehicle 10 at the time when the imaging unit 11 captures the surrounding image.

The processing circuit 31 of the control device 30 determines whether the surrounding image generated by the imaging unit 11 is the lost item image in which the belongings 51 are shown but the elementary school student is not shown. The processing circuit 31 transmits the notification information to the server device 20 on the condition that the surrounding image is the lost item image.

When the server device 20 receives the notification information from the vehicle 10, the server device 20 transmits the notification information to the information terminal 60. That is, the server device 20 transmits, to the information terminal 60, the notification information including the lost item image in which the belongings 51 are shown but the elementary school student is not shown, and the position information when the lost item image is generated by the imaging unit 11.

When the vehicle 10 is traveling near the elementary school, the imaging unit 11 of the vehicle 10 may capture only the belongings 51 of the elementary school student without any elementary school students around. In such a scene, there is a possibility that the elementary school student is involved in an incident in which the elementary school student is taken away with the belongings 51 left behind. Further, there is a possibility that the elementary school student has had an accident such as falling from a road where the belongings 51 are located into a river downward or under an elevated overpass. According to the information processing method, even when the elementary school student does not have the information terminal 60, it is possible to notify the elementary school or the employee of the elementary school that the elementary school student is in a state in which notification is required.

(2) When there is an elementary school student in the dangerous area within the school district of the elementary school, there is a possibility that the elementary school student is involved in an accident. Therefore, in the information processing method, when the imaging unit 11 generates the lost item image showing the belongings 51 in the dangerous area while the vehicle 10 is traveling, the notification information including the lost item image is transmitted from the control device 30 of the vehicle 10 to the server device 20. When the server device 20 receives the notification information from the vehicle 10, the server device 20 transmits the notification information to the information terminal 60. That is, the server device 20 transmits, to the information terminal 60, the notification information including the lost item image in which the imaging unit 11 captures the image of the belongings 51 in the dangerous area.

Thereby, according to the information processing method, it is possible for the employee of the elementary school to make aware of the possibility that the elementary school student has been involved in the accident in the dangerous area.

(3) When the vehicle 10 is traveling during the time of commuting to and from school, the imaging unit 11 of the vehicle 10 may capture the image of the elementary school student and the belongings 51. As described above, during the time of commuting to and from school, it is rare that there are no elementary school students around even though the belongings 51 are located on the street. In such situations, there is a possibility that the elementary school student is involved in the incident. According to the information processing method, when the surrounding image generated by the imaging unit 11 of the vehicle 10 during the time of commuting to and from school is the lost item image in which the belongings 51 of the elementary school student are shown, but the elementary school student is not shown, the notification information including the lost item image is transmitted from the control device 30 of the vehicle 10 to the server device 20. When the server device 20 receives the notification information from the vehicle 10, the server device 20 transmits the notification information to the information terminal 60.

This allows the employee of the elementary school to understand that the elementary school student may be involved in the incident during the time of commuting to and from school.

Modifications

The above embodiment may be modified as follows. Note that the above embodiment and each of the following examples may be combined with each other within a technically consistent range.

A part of the processes shown in FIG. 3 may not be executed. For example, when the process of determining that the surrounding image is the lost item image during the time of commuting to and from school is not performed, the process of step S110 may be omitted. In this case, when the processing circuit 31 determines in the process of step S106 that the belongings 51 shown in the lost item image are not located in the dangerous area (step S106; NO), the series of processes shown in FIG. 3 ends.

Further, for example, when the process of determining whether the belongings 51 shown in the lost item image are located in the dangerous area is not performed, the process of step S106 may be omitted. In this case, in the process of step S104, when it is determined that the surrounding image is the lost item image (step S104; YES), the process proceeds to step S110.

In the series of processes shown in FIG. 3, priority is given to the process of determining whether the belongings 51 shown in the lost item image are located in the dangerous area over the process of determining whether the time when the lost item image is generated by the imaging unit 11 is the time of commuting to and from school, but the present disclosure is not limited to this. Priority may be given to any of these processes. That is, step S106 and step S110 may be executed with the processing order reversed.

When it is determined that the surrounding image acquired in step S100 is the lost item image, the processing circuit 31 may transmit the notification information to the server device 20 even though at least one of the above two conditions (C1) and (C2) is not satisfied, even in the above case.

Instead of the process of determining whether the elementary school student is shown in the surrounding image using the first learned model 331, the processing circuit 31 may determine whether the elementary school student is shown in the surrounding image based on a result obtained by general image analysis. —Further, instead of the process of determining whether the belongings 51 are shown in the surrounding image using the second learned model 332, the processing circuit 31 may determine whether the belongings 51 are shown in the surrounding image based on a result obtained by general image analysis.

The imaging unit 11 may be a stereo camera. Further, the imaging unit 11 may be provided with a plurality of cameras (for example, a first camera and a second camera), and the cameras may be used to capture images in the same direction. Normally, the first camera may be used to capture images, and when a predetermined condition is satisfied, the second camera or both the first camera and the second camera may be used to capture images. Alternatively, the first camera may be used to capture an image near the imaging unit 11, and the second camera may be used to capture an image far from the imaging unit 11.

The imaging unit 11 may be attached to any location of the vehicle 10 as long as it can capture the image of the surroundings of the vehicle 10 and generate the surrounding image. For example, when capturing the image of the area behind the vehicle 10, the imaging unit 11 may be attached to the upper part of a rear windshield, the back door, or the like. Further, when capturing images of the areas to the sides of the vehicle 10 and the area diagonally behind the vehicle 10, the imaging unit 11 may be attached to a side-view mirror or the like.

The position information acquired by the position information acquisition unit 12 may be identified or supplemented by an inertial navigation system (INS) that uses outputs from various sensors included in the vehicle 10.

The dangerous area information 333 may be updated sequentially according to the traveling position of vehicle 10. For example, the control device 30 transmits the position information acquired by the position information acquisition unit 12 to an information providing server included in the information processing system 1. The information providing server identifies the school district of the received position information, and transmits the dangerous area information 333 related to the identified elementary school to the control device 30. The control device 30 transmits the notification information to the server device 20 of the corresponding elementary school while executing various determination processes based on the received dangerous area information 333.

The notification mode of the notification information of the information terminal 60 is not limited to display on the display unit. The information terminal 60 may be realized, for example, by a control device that controls in-school broadcasting at the elementary school. In this case, the information terminal 60 may notify the employee of the elementary school, etc. of a sound indicating that there is an elementary school student at the position of the position information included in the notification information, through the in-school broadcasting.

The server device 20 may be installed at a location other than the elementary school as long as it is installed outside the vehicle 10. The server device 20 may be installed, for example, in a business office of a business operator that provides the information processing system 1, or in a facility that manages the elementary school, such as a city hall. Further, the server device 20 does not need to be provided for each elementary school. In this case, the server device 20 identifies the corresponding elementary school based on the position information included in the notification information received from the control device 30. The server device 20 notifies the information terminal 60 installed at the identified elementary school and the information terminal 60 of the employee of the elementary school of the notification information.

In the above description, the processing circuit 31 makes various types of determination based on the surrounding image generated by the imaging unit 11, but the present disclosure is not limited to this. The processing circuit 21 of the server device 20 may make a part of the various types of determination made in the processing circuit 31. In this case, the processing circuit 31 transmits, to the server device 20, the surrounding image generated by the imaging unit 11 and in which the belongings 51 are shown, and the position information acquired by the position information acquisition unit 12 when the surrounding image is generated by the imaging unit 11 in association with each other. The processing circuit 21 makes various types of determination based on the surrounding image and the position information received from the control device 30. For example, the processing circuit 21 determines, based on the received position information, whether the surrounding image is the lost item image in which the belongings 51 of the elementary school student are shown but the elementary school student is not shown. When the processing circuit 21 determines that the surrounding image is the lost item image, the processing circuit 21 transmits the notification information including the lost item image and the position information associated with the lost item image to the information terminal 60. In this case, unlike the above embodiment, the server device 20 does not need to provide the vehicle 10 with the school route information.

Further, for example, the processing circuit 21 determines whether the lost item image is the surrounding image generated when the imaging unit 11 captures the image of the dangerous area, based on the surrounding image and the position information received from the control device 30. When the processing circuit 21 determines that the lost item image is the surrounding image generated when the imaging unit 11 captures the image of the dangerous area, the processing circuit 21 transmits, to the information terminal 60, the notification information including the lost item image and the position information associated with the lost item image. In this case, unlike the above embodiment, the server device 20 does not need to provide the vehicle 10 with the dangerous area information 333.

For example, when it can be determined that a person, which is not limited to an elementary school student, is shown in the surrounding image, the control device 30 of the vehicle 10 may transmit, to the server device 20, the surrounding image and the position information of the vehicle 10 when the surrounding image is generated in association with each other. In this case, the processing circuit 21 of the server device 20 determines whether the elementary school student is shown in the surrounding image by inputting the received surrounding image into the first learned model 331 or the like.

Further, for example, when it can be determined that an object, which is not limited to the belongings 51 of the elementary school student, is left on a road, the control device 30 of the vehicle 10 may transmit, to the server device 20, the surrounding image and the position information of the vehicle 10 when the surrounding image is generated in association with each other. In this case, the processing circuit 21 of the server device 20 determines whether the belongings 51 are shown in the surrounding image by inputting the received surrounding image into the second learned model 332 or the like. When the processing circuit 21 determines that the surrounding image is a surrounding image in which the belongings 51 are shown but the elementary school student is now shown, the processing circuit 21 may sequentially execute the processes of step S106 and onward shown in FIG. 3.

A part or all of the components of the processing circuit 21 and the processing circuit 31 may be implemented by hardware (circuit unit; including circuitry) such as large scale integration (LSI), application specific integrated circuit (ASIC), field-programmable gate array (FPGA), and a graphics processing unit (GPU), or may be implemented by cooperation between software and hardware.

What is claimed is:

1. An information processing method executed by an information processing system that includes a vehicle equipped with an imaging unit that generates a surrounding image by capturing an image of a surrounding situation, a position information acquisition unit that acquires position information of the vehicle, and a communication unit that communicates with outside, and a server device installed outside the vehicle, and is configured to transmit the surrounding image and the position information from the communication unit of the vehicle to the server device via a communication network, the information processing method comprising:

transmitting, from the communication unit of the vehicle to the server device, notification information including the surrounding image in which belongings of an elementary school student are shown, and position information of the vehicle when the surrounding image is generated by the imaging unit; and notifying, by a processing circuit of the server device, at least one of an information terminal owned by an elementary school and an information terminal owned by an employee of the elementary school of notification information including a lost item image that is the surrounding image in which the belongings of the elementary school student are shown but the elementary school student is not shown, and position information of the vehicle when the lost item image is generated by the imaging unit, from among the notification information.

2. The information processing method according to claim 1, wherein when the notification information is notified to at least one of the information terminal owned by the elementary school and the information terminal owned by the employee of the elementary school, the processing circuit of the server device notifies at least one of the information terminal owned by the elementary school and the information terminal owned by the employee of the elementary school of notification information including a lost item image that is the surrounding image in which the belongings of the elementary school student are shown but the elementary school student is not shown, the surrounding image being generated by the imaging unit when the imaging unit captures an image of a dangerous area in a school district of the elementary school, and the position information of the vehicle when the lost item image is generated by the imaging unit.

3. The information processing method according to claim 1, wherein when the notification information is notified to at least one of the information terminal owned by the elementary school and the information terminal owned by the employee of the elementary school, the processing circuit of the server device notifies at least one of the information terminal owned by the elementary school and the information terminal owned by the employee of the elementary school of notification information including a lost item image that is the surrounding image in which the belongings of the elementary school student are shown but the elementary school student is not shown, the surrounding image being generated by the imaging unit during a time of commuting to and from school at the elementary school, and the position information of the vehicle when the lost item image is generated by the imaging unit.

4. A non-transitory storage medium storing a program executed by a control device of a vehicle equipped with an imaging unit that generates a surrounding image by capturing an image of a surrounding situation, a position information acquisition unit that acquires position information of the vehicle, and a communication unit that communicates with a server device installed outside the vehicle, the server device being configured to be able to communicate with at least one of an information terminal owned by an elementary school and an information terminal owned by an employee of the elementary school, wherein the program causes the control device to execute acquiring notification information including a lost item image that is a surrounding image in which belongings of an elementary school student are shown but the elementary school student is not shown around the belongings, from among the surrounding image, and position information of the vehicle when the lost item image is generated by the imaging unit, and transmitting the notification information from the communication unit to the server device.

5. An information processing system including a vehicle equipped with an imaging unit that generates a surrounding image by capturing an image of a surrounding situation, a position information acquisition unit that acquires position information of the vehicle, and a communication unit that communicates with outside, and a server device installed outside the vehicle, wherein:

the communication unit of the vehicle transmits, to the server device via a communication network, notification information including the surrounding image in which belongings of an elementary school student are shown, and position information of the vehicle when the surrounding image is generated by the imaging unit; and the server device transmits, to at least one of an information terminal owned by an elementary school and an information terminal owned by an employee of the elementary school, notification information including a lost item image that is the surrounding image in which the belongings of the elementary school student are shown but the elementary school student is not shown, and position information of the vehicle when the lost item image is generated by the imaging unit, from among the notification information.

\* \* \* \* \*